United States Patent [19]

Nishiyama et al.

[11] 4,179,883
[45] Dec. 25, 1979

[54] REED VALVE ASSEMBLY

[75] Inventors: Takahiko Nishiyama, Kamakura; Kenji Haga, Fujisawa, both of Japan

[73] Assignee: Nippon Oil Seal Industry Co., Ltd., Tokyo, Japan

[21] Appl. No.: 777,456

[22] Filed: Mar. 14, 1977

[30] Foreign Application Priority Data

Oct. 21, 1976 [JP] Japan .................................. 51-142062

[51] Int. Cl.² ................................................ F01N 3/10
[52] U.S. Cl. ....................................... 60/293; 55/276; 137/856; 181/237; 427/26
[58] Field of Search ............................ 60/293; 55/276; 181/237; 137/855, 856; 427/26, 28, 181, 203, 206

[56] References Cited

U.S. PATENT DOCUMENTS

| 2,300,266 | 10/1942 | Smellie | 55/276 |
| 2,715,074 | 8/1955 | Hirschberger | 427/26 |
| 2,851,054 | 9/1958 | Campbell | 137/856 |
| 3,253,401 | 5/1966 | Wells | 60/293 |
| 3,286,728 | 11/1966 | Stephenson | 137/856 |
| 3,413,780 | 12/1968 | Amlott | 55/276 |
| 3,850,660 | 11/1974 | Inamura | 427/28 |
| 3,906,724 | 9/1975 | Yoshizaki | 60/305 |
| 3,922,410 | 11/1975 | Halloran | 427/206 |
| 4,022,245 | 5/1977 | Davis | 137/855 |
| 4,083,184 | 4/1978 | Ushijima | 60/293 |

FOREIGN PATENT DOCUMENTS 1926041  1/1970  Fed. Rep. of Germany ............. 60/293

Primary Examiner—Douglas Hart
Attorney, Agent, or Firm—Holman & Stern

[57] ABSTRACT

A reed valve assembly in which a gummous material coating is applied to the noise-propagating passageway of a secondary-air exhaust gas recombustion system for internal combustion engines.

1 Claim, 2 Drawing Figures

REED VALVE ASSEMBLY

BACKGROUND OF THE INVENTION

The present invention relates to a reed valve assembly and more particularly, is concerned with a reed valve assembly used in a secondary air exhaust burning system to recombust exhausted gas from an internal combustion engine.

A system in which the secondary air is fed into an exhaust port to recombust exhausted gas has been heretofore adopted in order to reduce the amounts of hydrocarbons, carbon monoxide, etc., contained in the exhausted gas from an internal combustion engine of, for example, an automobile. This system has a mechanism in which a reed valve permitting only an air flow toward an exhaust port is mounted, through the medium of a filter, in an air passageway located between a part where air is introduced from the outside and an exhaust port, so that the secondary air is fed into the exhaust port and exhausted gas does not reflow through the reed valve, by opening an shutting the reed valve utilizing negative pressure generated on the exhaust port side. The system itself is extremely effective as a means of purifying exhausted gas and has been applied to many automobiles. However, because of employing a reed valve, noises produced by the outward propagation of both symphathetic sounds produced by resonance during vibration of a reed and sounds of the reed being seated at a valve seat face have recently become a problem.

The object of the present invention is to solve the above-mentioned problem in prior art. The present invention is a reed valve assembly in which gummous material coating is applied to a noise-propagating passageway of an apparatus equipped with a reed valve in such a way, as to reduce the outward propagation of sympathetic sounds produced by the resonance of a reed of the reed valve.

BRIEF DESCRIPTION OF THE DRAWINGS

The above object and other objects, soon to become apparent, and attendant advantages of the present invention will become readily apparent by reference to the following detailed description, when considered, in conjunction, with the accompanying drawings, wherein.

DETAILED DESCRIPTION OF PREFERRED EMBODIMENT

Figure 1:
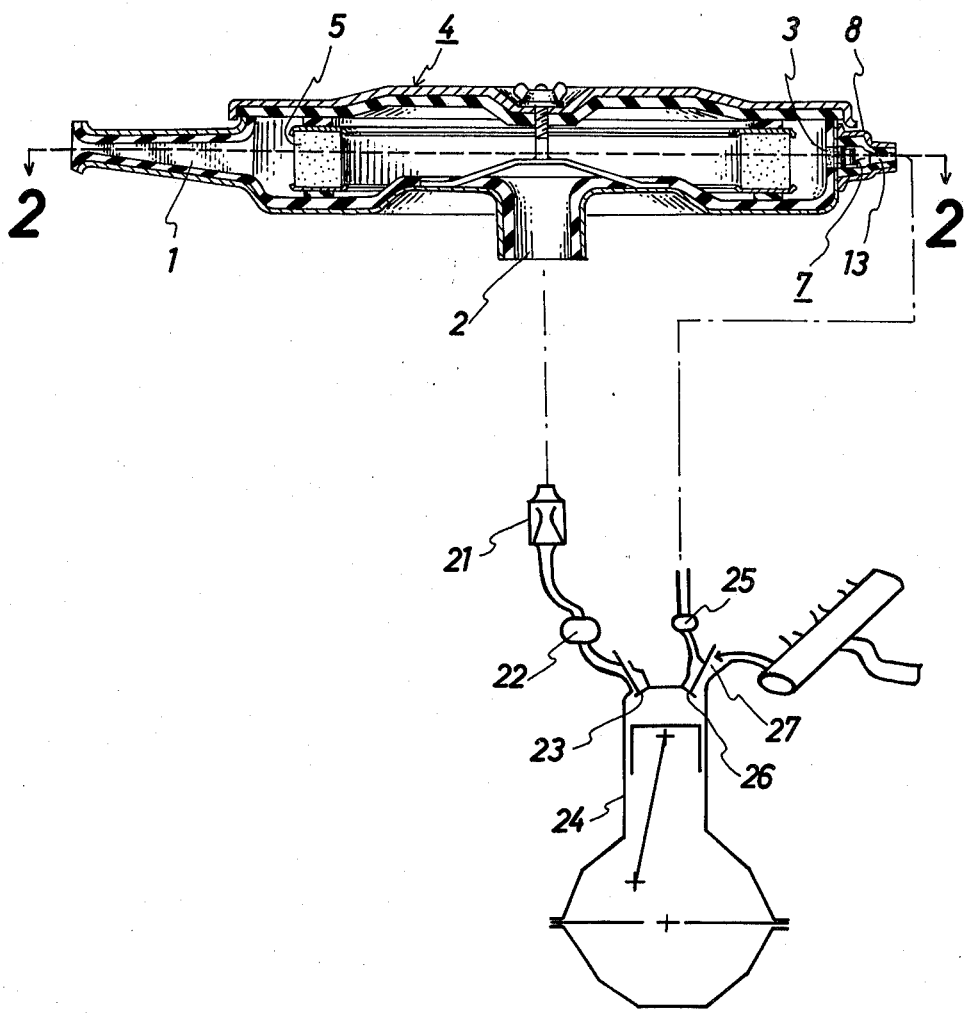
FIG. 1 is a cross-sectional view of a system embodying the present invention with a schematic representation of an internal combustion engine.

Referring to FIG. 1, the air induced through an air-inducing pipe 1 into a metallic filter case 4 is fed as primary air into an engine cylinder 24 through a first annular filter 5 located in the filter case 4 via a primary-air supply port 2, a carburetor 21, an intake manifold 22 and a suction valve 23, and as secondary air into an exhaust port 27 through which an exhaust gas passed from an exhaust valve 26 from the cylinder 24 is exhausted. The secondary air travels via a reed valve 7 located in a metallic reed valve case 8 fixed to a secondary-air supply port 3 of the filter case 4, an exhaust side outlet 13 of the reed valve case 8 and an air manifold 25.

Figure 2:
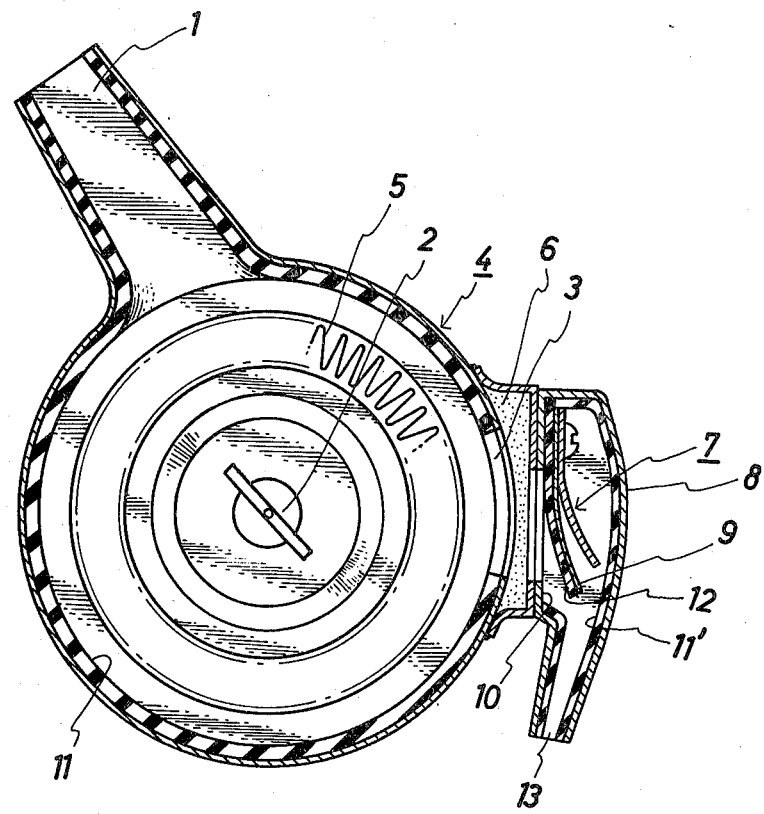
FIG. 2 is a cross-sectional view of FIG. 1 taken along lines 2-2. Like reference characters refer to like parts throughout several views of the drawings.

As shown in FIG. 2, the second filter 6 and the reed valve 7 which includes a metallic reed 9 and a base 10 having a valve seat are positioned inside of the reed valve case 8. The reed valve 7 is constructed in such a way that the base 10 having the valve seat and the reed 9 respectively, are positioned on the side of the second filter 6 and on the side of the exhaust side outlet 13 of the reed valve case 8 to open the reed 9, respectively, when the pressure inside the exhaust port leading to the exhaust-side outlet 13 is negative and close it when the pressure is positive.

Coatings 11 and 11' are applied to the inner surface of that apparatus equipped with the reed valve 7 which acts as a propagating passageway of the sympathetic sounds of the reed 9, the sounds of the reed 9 being seated, etc., in other words, to the inner surface of each of the reed valve case 8 and the filter case 4 on which the reed valve case 8 is mounted. The coatings 11 and 11' are of gummous material 3 mm to 10 mm in thickness which is composed of such gummous elastic materials as butyl, acrylic, nitrile, styrenebutadiene, chloroprene or silicone rubber among which the butyl and the acrylic are particularly preferable.

The thicker the gummous coatings 11 and 11' are, the more preferable they are. For example, the following means has been employed to make them thicker. In order to prevent a coating material in the solution state or in the latex state from flowing out during spreading operations, an acrylic or epoxy adhesive is firstly spread on the inner walls of the filter case 4 and the reed valve case 8 to be subjected to coating. Secondly, to the spreaded surface is applied the so-called "flocking" in which a large number of short fibers, such as nylon, arranged on the spreaded surface are caused to stand upright on the spreaded surface by applying static electricity thereto to form a fiber layer having a thickness of the length of the short fibers. Thirdly, liquid rubber is held by the fiber layer through spraying the gummous coating material on to the fiber layer. Heat-treating the liquid rubber held gives the coating layers 11 and 11' having a desired thickness. Furthermore, to that surface of the reed 9 of the reed valve 7 which fronts the valve seat is applied fluorocarbon resin (preferably, tetrafluoroethylene resin) coating 12.

Shown in Tables 1 and 2 are the results of measuring sound pressure at a measured point in front of the air-inducing pipe at a lengthwise distance of 150 mm at the times when a reed valve assembly based upon the present invention constructed as above-described, is used and when a reed valve assembly not based upon the present invention is used, in a secondary-air supply system. A gummous coating layer of thickness 3 mm which was used in each example was formed by forming a nylon short-fiber layer of thickness 3 mm by means of the above-mentioned flocking and then spreading acrylic rubber (Trade name: Noxtite 7885 NL. manufactured by Seiwa Chemical Ltd.) on to the nylon short-fiber layer.

TABLE 1

| Embodiment | | Sound Pressure (Phon) |
|---|---|---|
| Reference Example | A reed valve assembly of which neither a reed valve case nor a filter case is coated with gummous material and of which a reed is not coated with a fluorocarbon | 84.5 |

TABLE 1-continued

| Embodiment | Sound Pressure (Phon) |
|---|---|
| resin. | |

TABLE 2

| | Embodiments | Sound Pressure (Phon) |
|---|---|---|
| Example 1 | A reed valve assembly of which a reed valve case alone is coated with a gummous material and of which a reed is not coated with fluorocarbon resin. | 82.5 |
| Example 2 | A reed valve assembly of which a reed valve case alone is coated with gummous material and of which a reed is coated with fluorocarbon resin. | 80.0 |
| Example 3 | A reed valve assembly of which both a reed valve case and a filter case are coated with gummous material and of which a reed is not coated with fluorocarbon resin. | 76.5 |
| Example 4 | A reed valve assembly of which both reed valve case and filter case are coated with gummous material and of which a reed is coated with gummous material. | 75.0 |

As can be seen from the results of measuring sound pressure, a reed valve assembly of which the propagating passageway of noises produced from the reed 9 is coated with gummous material shows a decrease in detectable noises from the outside as compared with a reed valve, one without coating. Coating, particularly on to the whole propagating passageway, i.e., the reed valve case 8 and the filter case 4, permits the reed valve assembly to have the effect of reducing noises strikingly. It has become apparent that, in addition to the coating with gummous material, the reed valve assembly in which a reed is coated with fluorocarbon resin has the effect of reducing the noises remarkably.

Though a reed valve assembly which is allowed to have a sound-absorbing effect by applying the gummous coating to the inner wall alone of the propagating passageway of noises as shown in Examples, applying the same gummous coating as that described above to the outer wall of the propagating passageway of noises too, permits the reed valve assembly to have a vibration-absorbing effect, whereby it is possible to aim at the reductions of vibration and vibration sounds produced thereby. A reed valve assembly of which the reed valve case 8 including the reed valve 7 is fixed to the filter case 4 inducing the primary is shown in Examples. Even if the reed valve case 8 is fixed to apparatus other than the filter case 4 inducing the primary air, the reed valve assembly has the same effect of reducing sounds as that above described so long as the propagating passageway of sounds is coated with gummous material.

It is readily apparant that the above-described reed valve assembly meets all the object mentioned above and also has the advantage of wide commercial utility.

The embodiments of the invention in which an exclusive property or privilege is claimed are defined as follows:

1. In a secondary-air exhaust gas recombustion system for internal combustion engines having noise-propagating passageways, a reed valve assembly comprising,
   a reed valve case having a secondary-air supply port and a secondary-air outflow passage,
   a valve seat surrounding said secondary-air supply port,
   a reed secured in said reed valve case covering said valve seat,
   a secondary-air supply means from said secondary air outflow passage to an exhaust gas recombustion means, and
   a coating of gummous material applied to the interior surface of the noise-propagating passageways including said reed valve case,
   said coating of gummous material being applied by the steps comprising,
   spreading an adhesive on the interior surface, applying a large number of short fibers to the adhesive-spread surfaces, and
   spraying the gummous coating material onto the fiber layer.

* * * * *